US011147290B2

(12) United States Patent
Cocchi et al.

(10) Patent No.: US 11,147,290 B2
(45) Date of Patent: Oct. 19, 2021

(54) MACHINE FOR THE PRODUCTION OF LIQUID OR SEMI-LIQUID FOOD PRODUCTS

(71) Applicant: ALI GROUP S.R.L.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco Sul Naviglio (IT)

( * ) Notice: Subject to any disclaimer, the term of this patent is extended or adjusted under 35 U.S.C. 154(b) by 127 days.

(21) Appl. No.: 16/659,049

(22) Filed: Oct. 21, 2019

(65) Prior Publication Data
US 2020/0120950 A1    Apr. 23, 2020

(30) Foreign Application Priority Data
Oct. 22, 2018    (IT) .......................... 102018000009648

(51) Int. Cl.
*A23G 9/22*    (2006.01)
(52) U.S. Cl.
CPC ................... *A23G 9/227* (2013.01)
(58) Field of Classification Search
CPC .......... A23G 9/227; A23G 9/228; A23G 9/08; A23G 9/281; A23G 9/00; A23G 9/14;
(Continued)

(56) References Cited

U.S. PATENT DOCUMENTS 6,637,214 B1  10/2003  Leitzke et al.
2008/0173038 A1*  7/2008  Cocchi .................. A23G 9/228
                                                                62/342
(Continued)

FOREIGN PATENT DOCUMENTS

CN    101444247 A    6/2009
EP      2255673 A1  12/2010
(Continued)

OTHER PUBLICATIONS

Japanese Search Report issued by the Japanese Patent Office from counterpart Japanese Patent Application No. 2020015761.
(Continued)

*Primary Examiner* — Joseph F Trpisovsky
(74) *Attorney, Agent, or Firm* — Shuttleworth & Ingersoll, PLC; Timothy Klima

(57) ABSTRACT

A machine for making liquid or semi-liquid food products includes a processing chamber; a frame defining an opening to the chamber; a stirrer mounted inside the chamber; a cooling system including a heat exchanger associated with the chamber; a closing device connected to the frame and movable between a closed configuration occlude the opening, and an open configuration allowing access to the chamber through the opening. The closing device includes a door hinged to the frame. A retaining device acts on the closing device to maintain the closed configuration. The retaining device includes a rotary element, connected to one between the door and the frame and a stop provided on the other. The rotary element is rotatable between a retaining configuration, engaging the stop to stop the opening of the door, and a disengaged configuration, disengaged from the stop to allow opening of the door.

15 Claims, 7 Drawing Sheets

(58) Field of Classification Search
CPC .. A23G 9/22; A23G 9/12; A23G 9/222; F25D 23/028; F25D 23/025; F25D 23/02
See application file for complete search history.

(56) References Cited

U.S. PATENT DOCUMENTS

| | | | | |
|---|---|---|---|---|
| 2014/0102128 A1* | 4/2014 | Jejcic | ................ | A23G 9/12 |
| | | | | 62/342 |
| 2015/0150280 A1* | 6/2015 | Cocchi | ................ | A23G 3/02 |
| | | | | 222/509 |
| 2016/0174593 A1* | 6/2016 | Cocchi | ................ | A23G 9/12 |
| | | | | 62/68 |

FOREIGN PATENT DOCUMENTS

| | | |
|---|---|---|
| EP | 2279669 A2 | 2/2011 |
| EP | 2708142 A1 | 3/2014 |
| EP | 3360423 A1 | 8/2018 |
| JP | A202065544 | 4/2020 |

OTHER PUBLICATIONS

Italian Search Report dated May 24, 2019 from counterpart Italian App No. 201800009648.

* cited by examiner

MACHINE FOR THE PRODUCTION OF LIQUID OR SEMI-LIQUID FOOD PRODUCTS

This application claims priority to Italian Patent Application 102018000009648 filed Oct. 22, 2018, the entirety of which is incorporated by reference herein.

BACKGROUND OF THE INVENTION

This invention relates to the field of the production of liquid and semi-liquid products with reference in particular to the ice cream sector.

More in detail, this invention relates to a machine for the production of liquid or semi-liquid food products, in particular, ice cream.

Known in the prior art are ice cream making machines comprising a container, a stirrer mounted inside the container to stir the contents thereof and a cooling system for cooling the contents of the container while it is being stirred by the stirrer.

The stirrer typically comprises an electrically driven rotating mechanism controllable by the operator through a specific interface.

On account of its high rotation speed and the resulting moment of inertia, the rotating mechanism, when it is switched off, slows down gradually and typically takes a few seconds to come to a complete stop.

Prior art machines are also provided with a door which gives access to the space inside the container and to the stirrer.

The door is closed to seal the internal space while the stirrer is in operation and access to the internal space, for maintenance or cleaning purposes, for example, is allowed only when the stirrer is not in operation.

In the prior art machines described above, it is theoretically possible for the operator to open the door before the stirrer has come to a complete stop.

However much this risk is effectively averted by user manuals of present-day machines and however minimal the probability of accidents being caused in this way, increasingly stringent safety standards and regulations have given rise to the need to provide devices to limit the possibility of gaining access to the internal space before the stirrer has come to a complete stop.

Moreover, disadvantageously, opening the door before the stirrer has come to a complete stop could cause the contents of the internal space to be spattered outside because the stirrer is still in motion.

SUMMARY OF THE INVENTION

In this context, the technical purpose which forms the basis of the present invention is to propose a machine for making liquid or semi-liquid food products to overcome at least some of the above mentioned disadvantages of the prior art.

More specifically, this invention has for an aim to provide a machine for making liquid or semi-liquid food products capable of improving the safety level guaranteed by prior art machines.

Another aim of this invention is to propose a machine for making liquid or semi-liquid food products which prevents the product from spattering.

The technical purpose indicated and the aims specified are substantially achieved by a machine for making liquid or semiliquid food products, comprising the technical features set out in the present disclosure. The present disclosure also discloses possible embodiments of the invention.

Further features and advantages of the invention are more apparent in the detailed description below, with reference to a preferred, non-limiting embodiment of a machine for making liquid or semiliquid food products.

BRIEF DESCRIPTION OF THE DRAWINGS

The description is set out below with reference to the accompanying drawings which are provided solely for purposes of illustration without restricting the scope of the invention and in which.

DESCRIPTION OF THE PREFERRED EMBODIMENTS

Figure 1:
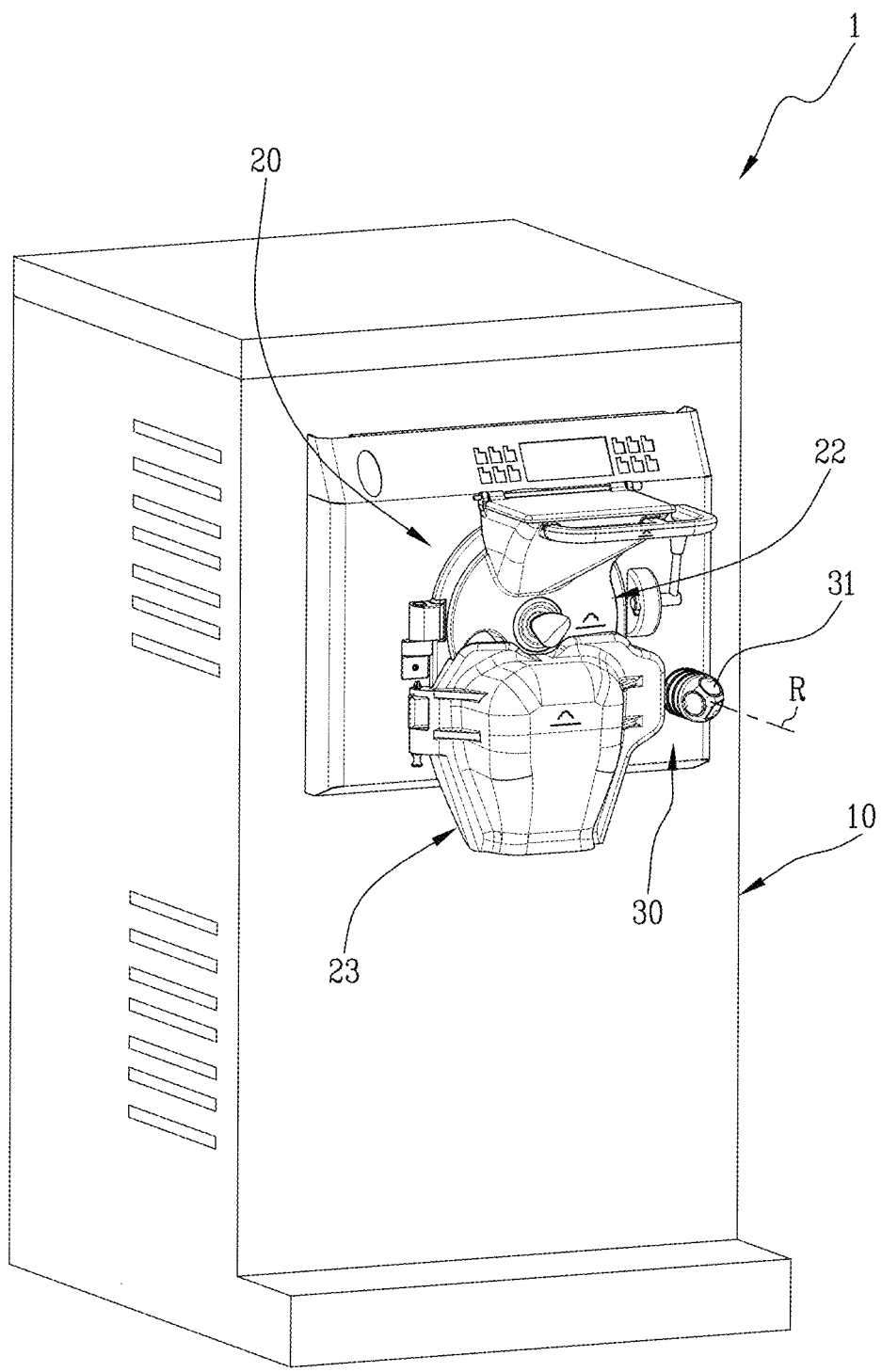
FIG. 1 is a perspective view of a machine according to this invention for making liquid or semi-liquid food products.

With reference to the drawings, a machine according to this invention, for making liquid or semi-liquid food products, specifically ice cream, is illustrated in the accompanying drawings and is generically denoted by the reference numeral 1.

For convenience, the machine will hereinafter be referred to simply as "machine 1".

The machine 1 comprises a frame 10 which defines the body of it and the respective internal spaces.

The frame 10 defines a processing chamber 15, preferably cylindrical, configured to make an ice cream product, and a respective opening 16 which allows access to it.

Inside the chamber 15, the machine 1 comprises a stirrer 17, preferably provided with a plurality of blades which rotate about an axis of extension of the chamber 15 itself.

The machine 1 also comprises at least a cooling system which, in its simplest form, comprises at least a first heat exchanger associated with the chamber 15, a second heat exchanger, a compressor operating between them, and a pressure reducing element to perform a refrigerating cycle (adapted to implement a vapor compression cycle) and to cool the chamber 15.

Figure 3:
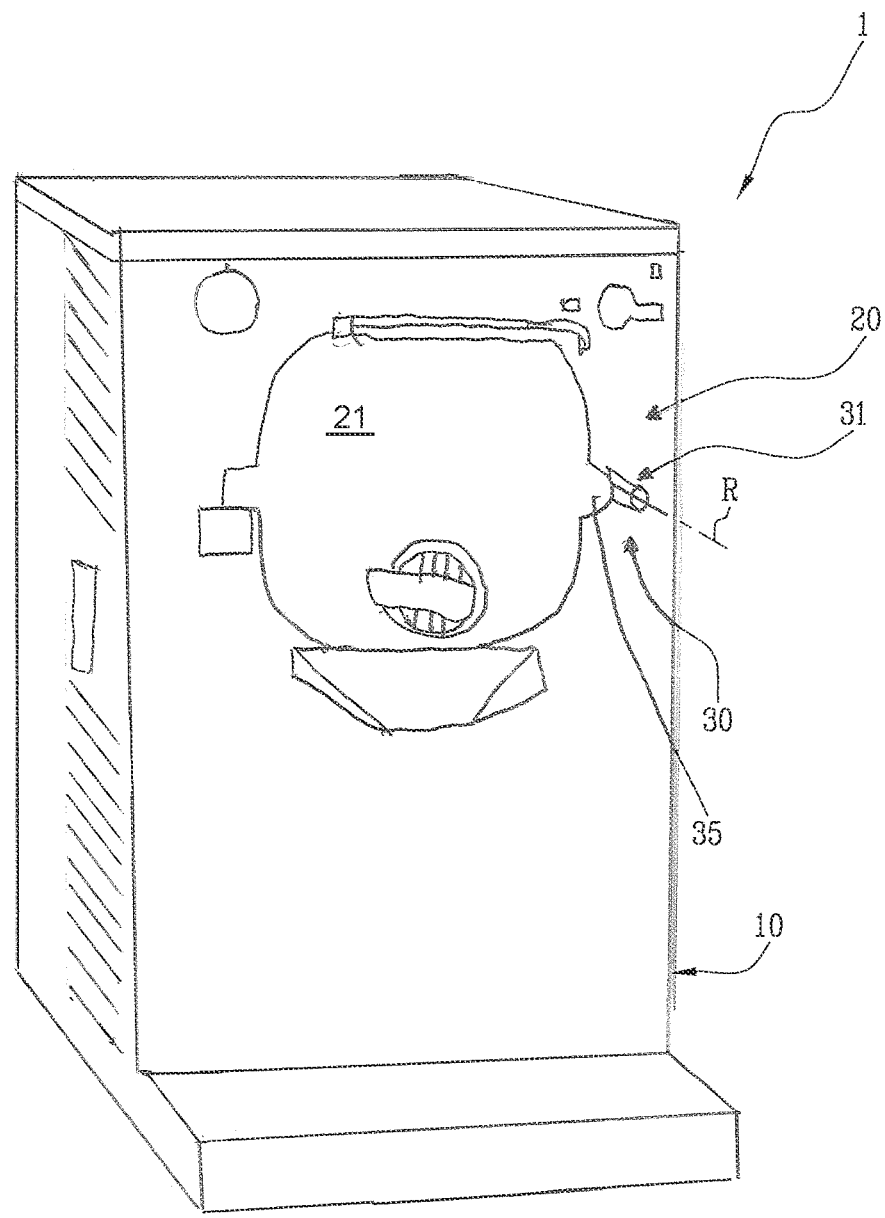
FIG. 3 is a perspective view of a machine for making liquid or semi-liquid food products in an alternative embodiment of this invention.
Figure 4:
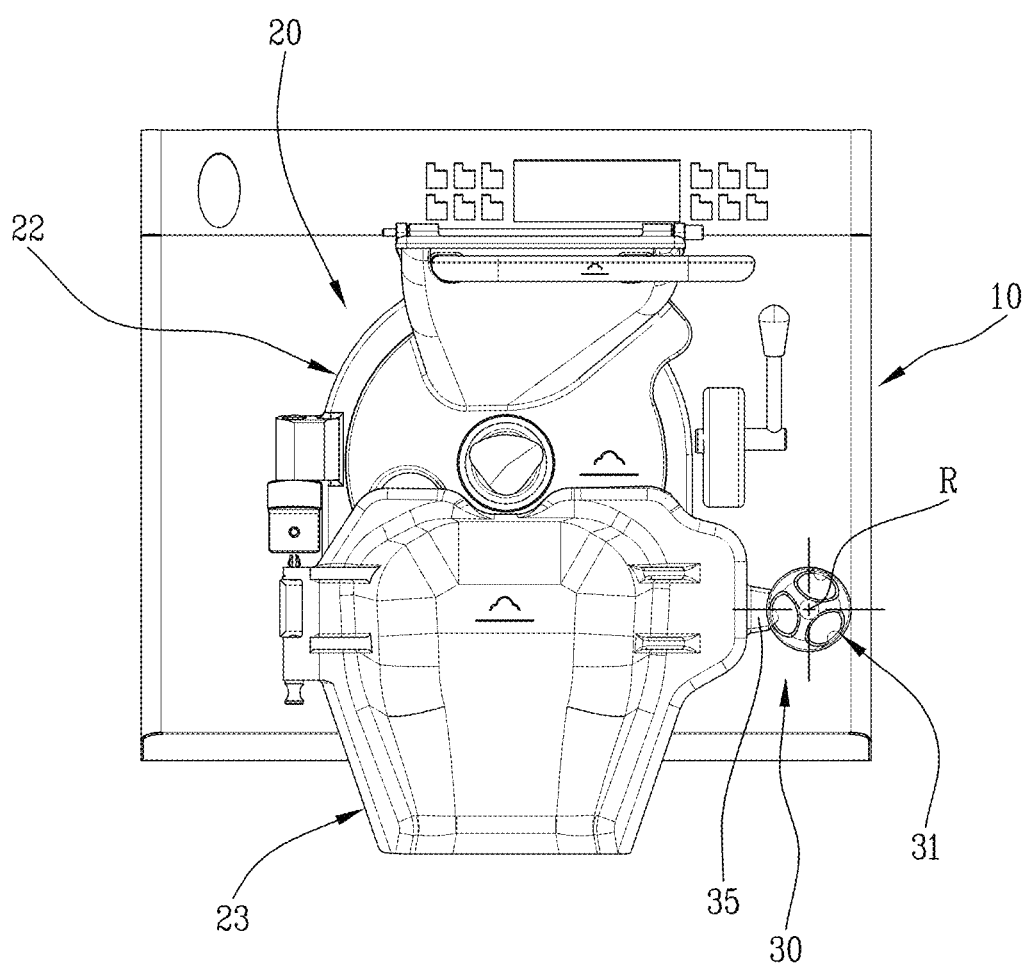
FIG. 4 shows a front view of a detail of the machine of FIG. 1.
Figure 5:
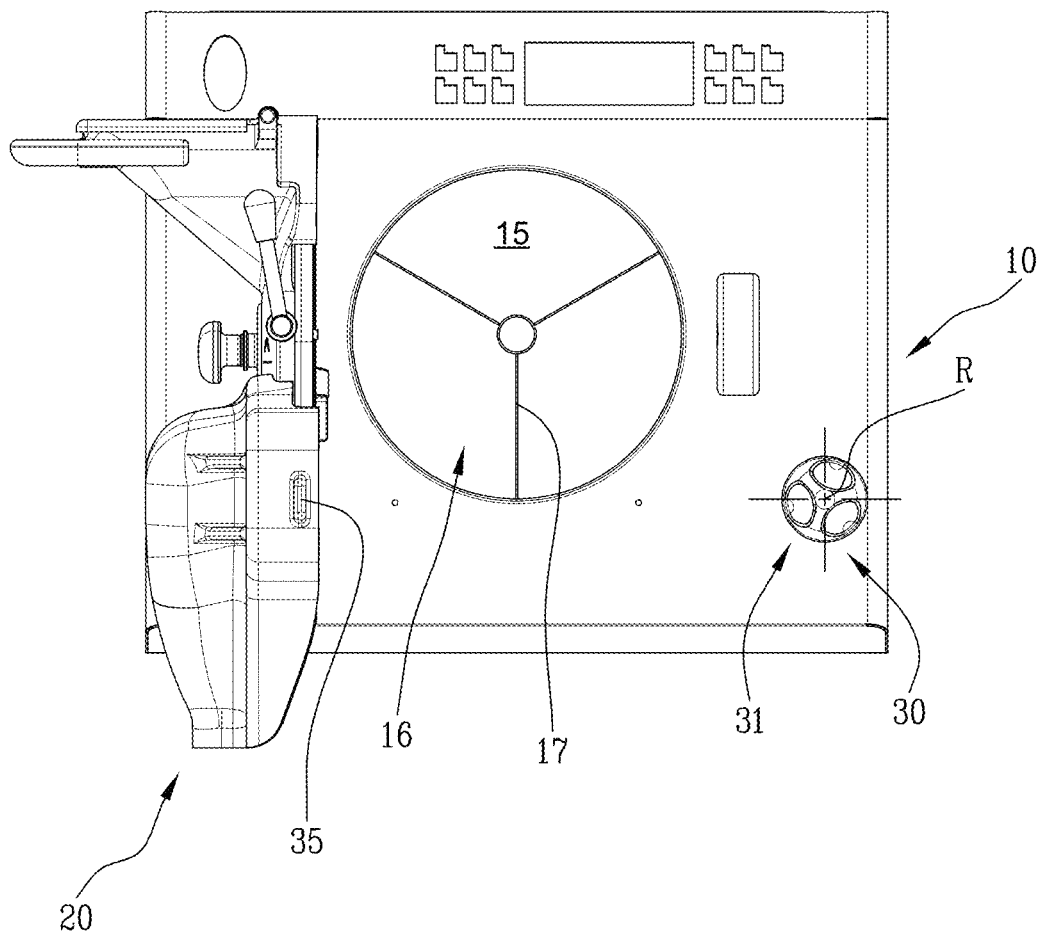
FIG. 5 shows a front view of a detail of the machine of FIG. 1 in a different operating configuration.
Figure 6:
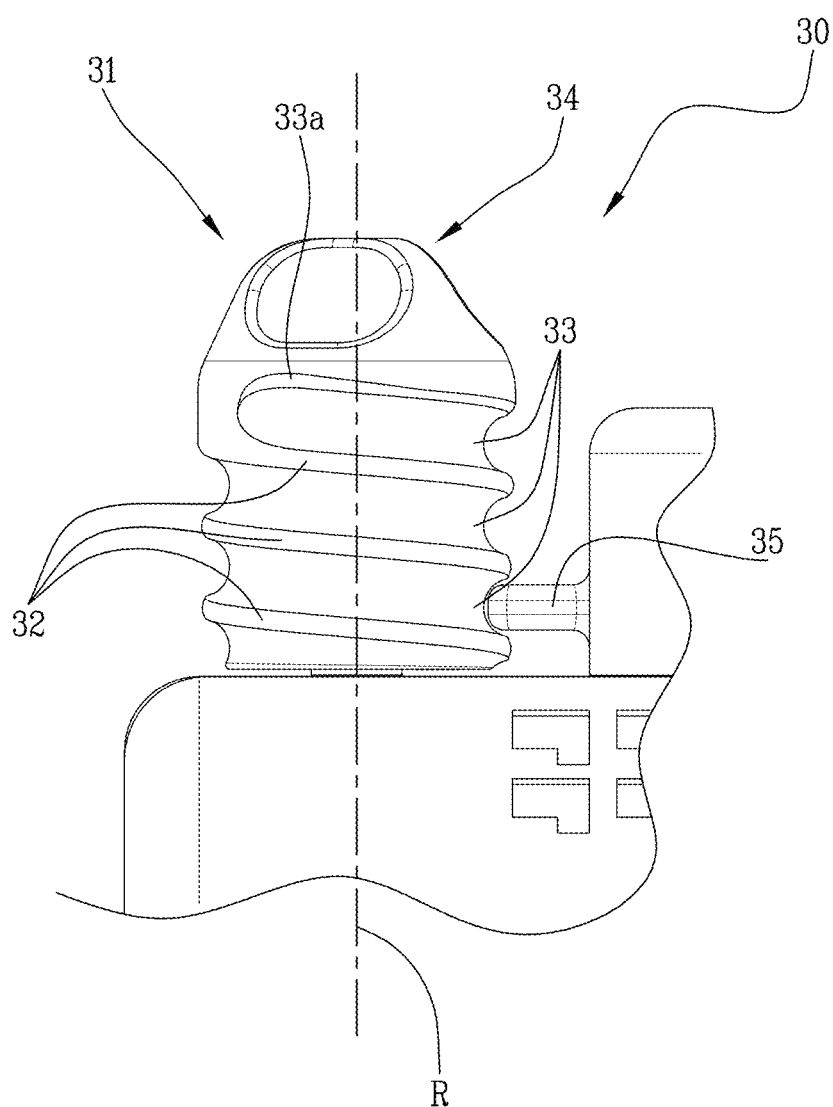
FIG. 6 is a top view of a detail of the machine of FIG. 1.

The machine 1 also comprises closing means 20 connected to the frame 10 at the opening 16 and movable between a closed configuration, illustrated in FIGS. 1 to 4, and an open configuration, illustrated in FIG. 5.

In the closed configuration, the closing means 20 at least partly occlude the opening 16 to prevent access to the chamber 15.

In other words, in the closed configuration, the closing means 20 allow substances in liquid, granular or powder form to be placed in the chamber 15 and/or the finished product to be extracted from the chamber, while preventing the operator from physically accessing the chamber 15.

In the open configuration, the closing means 20 allow the operator to gain access to the chamber 15 through the opening 16 to perform cleaning and/or maintenance operations and/or to extract the product.

In at least a first embodiment, illustrated in FIG. 3, the closing means 20 comprise a single door 21, hinged to the frame 10 and movable about the respective hinge between the closed configuration and the open configuration.

In a second embodiment, illustrated in FIGS. 1, 2, 4 and 5, the closing means 20 comprise an inner door 22, connected to the frame 10 and movable between a respective closed configuration and a respective open configuration.

More precisely, the inner door 22 is hinged to the frame 10.

The inner door 22 is provided with one or more further openings, smaller in size than the opening 16 and configured to allow partial access to the chamber 15, for example to allow substances to be placed inside and/or product to be extracted, when the inner door 22 is in the closed position.

It should be noted that the one or more further openings are each preferably provided with further closing covers, adapted to at least partly occlude the one or more further openings.

In the second embodiment, the closing means 20 also comprise an outer door 23 which is hinged to the frame 10. When the inner door 22 is in the closed configuration, the outer door 23 is movable about the respective hinge independently of the inner door 22 between a respective closed configuration, illustrated in FIGS. 1, 2 and 4, and a respective open configuration.

In the closed configuration, the outer door 23 is abutted against the inner door 22 to limit the possibility of the latter opening and is positioned in front of at least one of the further openings so as to limit or prevent access thereto.

In the open configuration, the outer door 23 at least partly exposes the further opening, for example to allow the operator to clean it.

The machine 1 according to this invention comprises retaining means 30 acting on the closing means 20 to keep them in the closed configuration.

Advantageously, the retaining means 30 comprise a rotary element 31 which is rotatable about a respective axis of rotation "R" and associated with at least one of the doors of the machine 1.

Figure 2:
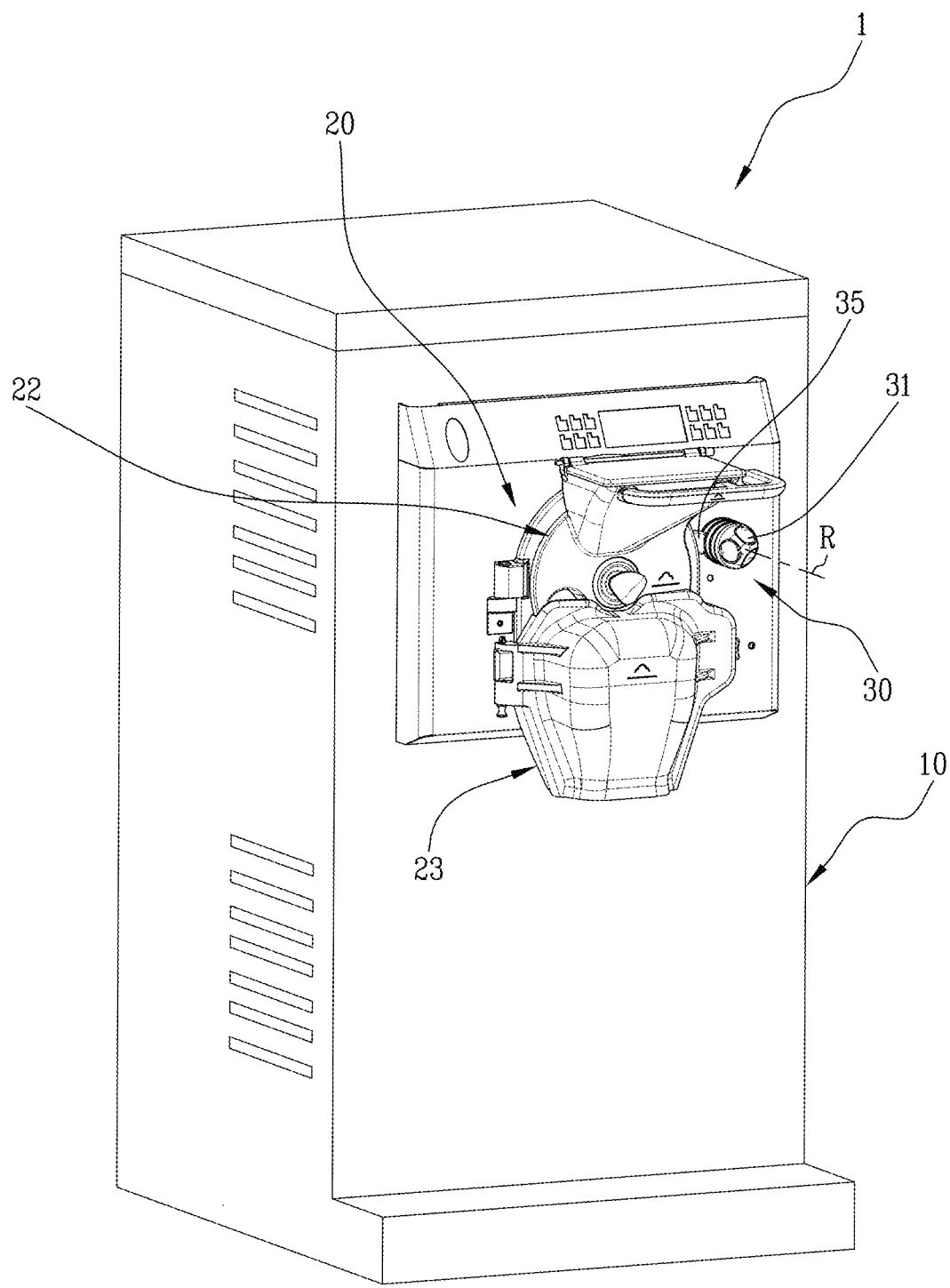
FIG. 2 is a perspective view of a machine for making liquid or semi-liquid food products in an alternative embodiment of this invention.

More specifically, in the first embodiment, the rotary element 31 is associated with the single door 21, whilst the second embodiment has a first variant, illustrated in FIGS. 1, 3 and 4, in which the rotary element 31 is associated with the outer door 23, and a second variant, illustrated in FIG. 2, in which the rotary element 31 is associated with the inner door 22.

For simplicity of description, the door associated with the rotary element 31 is referred to as door 21 and what is stated with regard to it is applicable by analogy to the inner door 22 or to the outer door 23 of the second embodiment.

Preferably, the rotary element 31 is connected to the frame 10 in proximity to the respective door 21. In an alternative embodiment not illustrated, the rotary element 31 is mounted on the respective door 21.

In the preferred embodiment, the rotary element 31 has a crest 32 in the form of a cylindrical helix winding round the axis of rotation "R", with a pitch between turns measuring preferably between 25 mm and 5 mm and, still more preferably, between 20 mm and 5 mm.

In a further variant, the rotary element 31 has a crest 32 in the form of a cylindrical helix winding round the axis of rotation "R", with a pitch between turns measuring preferably between 15 mm and 5 mm.

The rotary element 31 also has a cylindrical helical guide 33 defined by successive turns of the crest 32 to form a screw-like structure.

Preferably, the rotary element 31 has a grip portion 34 disposed along the axis of rotation "R" to allow the rotary element 31 to be manually operated by turning it about the axis of rotation "R".

In the embodiments illustrated, the rotary element 31 comprises a main body, preferably made as one piece, extending along the axis of rotation "R" and provided with the crest 32 and the grip portion 34.

More specifically, the main body is bulb shaped and the grip portion 34 is defined by three recesses made on one end of it and angularly equispaced about the axis of rotation "R".

The retaining means 30 also comprise a stop 35 associated with the rotary element 31.

In particular, in the embodiments in which the rotary element 31 is connected to the frame 10, the stop 35 is mounted on the respective door 21, whilst in the embodiments not illustrated, in which the rotary element 31 is mounted on the respective door 21, the stop 35 is structurally connected to the frame 10.

The rotary element 31 is rotatably movable about the axis of rotation "R" between a retaining configuration, illustrated in FIGS. 1 to 4, and a disengaged configuration, illustrated in FIG. 5.

In the retaining configuration, the rotary element 31 engages the stop 35 to lock the door 21 in the closed configuration and, in the disengaged configuration, the rotary element 31 disengages the stop 35 to allow the door 21 to move freely to the open configuration.

In the second variant of the second embodiment, the rotary element 31 in the retaining configuration is configured to lock the outer door 23 in the closed configuration, in abutment against the inner door 22 so as to also prevent the latter from opening.

More specifically, in the disengaged configuration, the rotary element 31 allows the door 21 to be turned freely about the respective hinge.

Preferably, the retaining means 30 require the rotary element 31 to be rotated by at least half a turn to pass from the retaining configuration to the disengaged configuration.

More preferably, the retaining means 30 require the rotary element 31 to be rotated by at least 1 complete turn to pass from the retaining configuration to the disengaged configuration.

More preferably, the retaining means 30 require the rotary element 31 to be rotated by at least 2 complete turns to pass from the retaining configuration to the disengaged configuration.

In the preferred embodiment, the rotation is between two and four turns of the rotary element 31, preferably approximately three turns.

Preferably, the length of time taken to turn the rotary element 31 manually by the number of turns needed to take it from the retaining configuration to the disengaged configuration is greater than the length of time taken by the stirrer 17 to come to a complete stop after being switched off.

More specifically, the crest 32 is configured to engage the stop 35 to constrain the movement of the door 21 towards the open configuration during the entire rotation of the rotary element 31 between the retaining configuration and the disengaged configuration.

In other words, the crest 32 prevents the door 21 from being turned freely about the respective hinge when the rotary element 31 is turned to a position between the retaining configuration and the disengaged configuration.

Preferably, turning the rotary element 31 between the retaining configuration and the disengaged configuration produces a corresponding constrained movement by which the door 21 passes between the closed configuration and a half-open configuration.

In the half-open configuration, the door 21 is drawn substantially close to the frame 10 so that the operator of the machine 1 has limited access to the chamber 15 and the opening 16 leaves a gap that is just large enough for the passage of liquids, powders or granules.

Furthermore, the guide 33 is configured to receive the stop 35 to define therewith a cam which is capable of uniquely adjusting the position of the door 21 between the closed configuration and the half-open configuration as a function of the number of turns performed by the rotary element 31 between the retaining configuration and the disengaged configuration.

More specifically, the guide 33 is configured to prevent the door 21 from moving independently of the rotation of the rotary element 31 when the stop 35 engages the rotary element 31 at an intermediate position between the retaining configuration and the disengaged configuration.

In an alternative embodiment, the stop 35 is provided with a fork that is connectable to the crest 32 of the rotary element 31 to define a similar cam.

Preferably, the rotary element 31 defines a disengagement portion 33a adjacent to the guide 33 and configured and disposed to allow disengaging the stop 35 and the guide 33 when the rotary element 31 is disposed in the disengaged configuration.

More in detail, in the preferred embodiment, the disengagement portion 33a is defined by a groove or absence of material of the rotary element 31, disposed in such a way as to be adjacent to the position of the stop 35 in the guide 33 in the disengaged configuration.

In the embodiment (illustrated) in which the rotary element 31 is mounted on the frame 10, the disengagement portion 33a is disposed at the end of the guide 33 furthest from the frame 10.

In the embodiment (not illustrated) in which the rotary element 31 is mounted on the door 21, the disengagement portion 33a is disposed at the end of the guide 33 closest to the door 21.

The stop 35 and the disengagement portion 33a are shaped in such a way that the stop 35 engages the disengagement portion 33a during a movement of the door 21 between the half-open configuration and the open configuration.

The disengagement portion 33a allows the stop 35, and thus the door 21, to move away from the frame 10 independently of the rotation of the rotary element 31. It also allows the stop 35 to leave the guide 33 and to disengage the rotary element 31.

Figure 7:
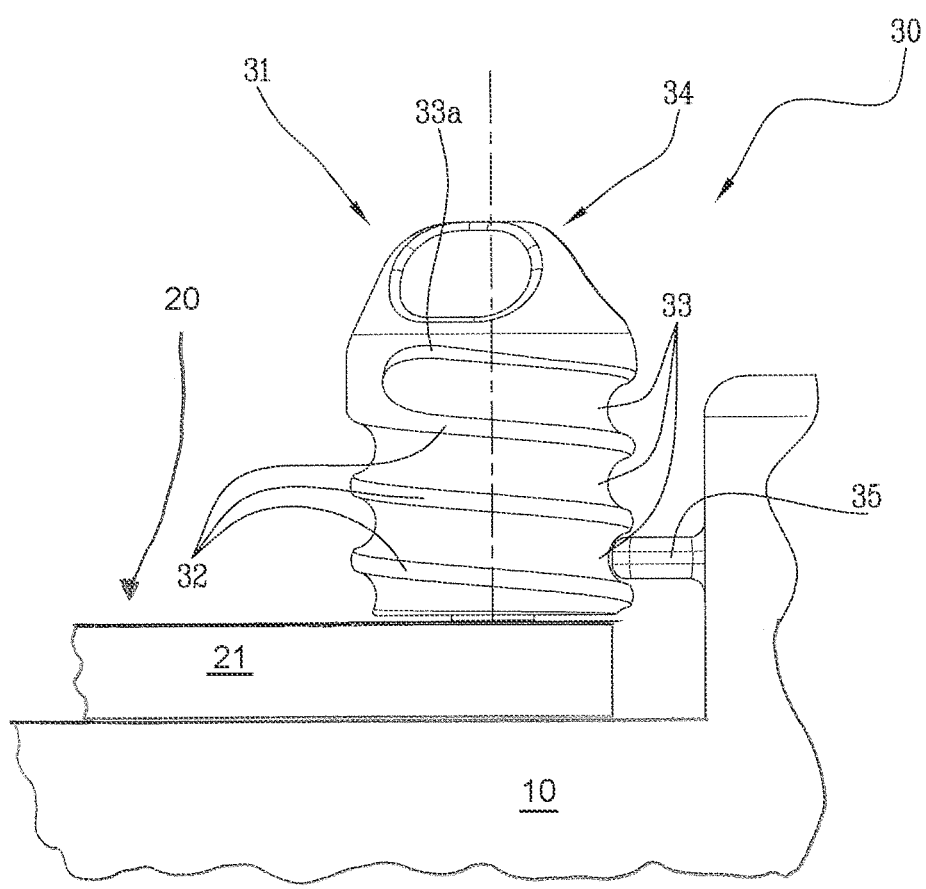
FIG. 7 is a top view of a detail of an alternative embodiment of the machine of FIG. 1.

Similarly, when the door 21 is closed, the disengagement portion 33a allows the stop 35 to re-engage the rotary element 31 and, in particular, the guide 33. FIG. 7 shows an alternative embodiment where the stop 35 is attached to the frame 10 and the rotary element 31 is attached to the door 21.

The invention achieves the set aim by overcoming the disadvantages of the prior art.

Advantageously, the configurations of the rotary element and stop ensure that the time taken for the door to open is long enough to allow the stirrer to come to a complete stop before the operator can gain access to the processing chamber.

This aspect increases the safety level because it prevents the operator from accessing the internal chamber when the rotary element is positioned between the retaining configuration and the disengaged configuration.

Furthermore, since the movement of the door between the closed configuration and the half-open configuration is constrained to the rotation of the rotary element, incorrect closure by accidentally not turning the rotary element properly to the retaining configuration is not possible. In this situation, it is thus impossible for the operator to start the production process unless the door is properly closed.

The invention claimed is:

1. A machine for making liquid or semi-liquid food products, comprising:
   a processing chamber for making an ice cream product;
   a frame defining an opening giving access to the processing chamber;
   a stirrer mounted inside the processing chamber;
   a cooling system, including at least one heat exchanger associated with the processing chamber to exchange heat with the processing chamber in order to cool the processing chamber;
   a closing device connected to the frame and movable between a closed configuration, at least partly occluding the opening, and an open configuration, allowing access to the processing chamber through the opening, the closing device comprising at least one door hinged to the frame;
   a retaining device acting on the closing device to keep the closing device in the closed configuration;
   wherein the retaining device comprises a rotary screw, connected to one of the at least one door and the frame and a respective stop surface connected to the other of the at least one door and the frame, the rotary screw being rotatably movable about a respective axis of rotation between a retaining configuration, where the rotary screw engages the stop surface to stop an opening movement of the at least one door, and a disengaged configuration, where the rotary screw disengages the stop surface to allow the opening movement of the at least one door,
   wherein the retaining device requires the rotary screw to be rotated in order to pass from the retaining configuration to the disengaged configuration, and vice versa;
   wherein rotating the rotary screw between the retaining configuration to the disengaged configuration causes constrained movement of the at least one door between the closed configuration and a partially open configuration, where the at least one door limits access to the processing chamber through the opening.

2. The machine according to claim 1, wherein the rotary screw has a crest extending in helical cylindrical fashion about the axis of rotation and configured to engage the stop surface to constrain the movement of the at least one door towards the open configuration.

3. The machine according to claim 2, wherein the rotary screw has a helical cylindrical guide defined by successive turns of the crest, the helical cylindrical guide being configured to accommodate the stop surface to define, in conjunction with the stop surface, a cam adapted to adjust the position of the at least one door between the closed configuration and the partially open configuration as a function of a rotation of the rotary screw between the retaining configuration and the disengaged configuration.

4. The machine according to claim 3, wherein the rotary screw includes a disengagement portion adjacent to the guide and configured and/or disposed to allow disengaging the stop surface and the guide from each other when the rotary screw is disposed in the disengaged configuration, the stop surface engaging the disengagement portion during a movement of the at least one door between the partially open configuration and the open configuration.

5. The machine according to claim 2, wherein a pitch of the helical cylindrical crest, measured between successive turns thereof, is between 30 mm and 10 mm.

6. The machine according to claim 2, wherein the rotary screw has a grip portion disposed along the axis of rotation to allow the rotary screw to be operated manually.

7. The machine according to claim 6, wherein the rotary screw comprises a main body extending along the axis of rotation and including the crest and the grip portion.

8. The machine according to claim 1, wherein the at least one door is hinged to the frame, the stop surface being provided on the at least one door.

9. The machine according to claim 1, wherein the closing device comprises an inner door for covering the opening and including a further opening configured to allow partial access to the processing chamber when the inner door is in the closed position; and an outer door movable between a closed configuration, where the outer door is disposed in abutment against the inner door and positioned in front of the further opening, and an open configuration, where the outer door exposes the further opening at least partly to the outside; the rotary screw and the stop surface operating on the outer door to keep both the outer door and the inner door in the closed configuration.

10. The machine according to claim 1, wherein the closing device comprises an inner door for covering the opening and including a further opening configured to allow partial access to the processing chamber when the inner door is in the closed position; and an outer door movable between a closed configuration, where the outer door is disposed in abutment against the inner door and positioned in front of the further opening, and an open configuration, where the outer door exposes the further opening at least partly; the rotary screw and the stop surface operating only on the inner door to keep the inner door in the closed configuration.

11. The machine according to claim 2, wherein a pitch of the helical cylindrical crest, measured between successive turns thereof, is between 25 mm and 10 mm.

12. The machine according to claim 7, wherein the main body is made as one piece.

13. A machine for making liquid or semi-liquid food products, comprising:
  a processing chamber for making an ice cream product;
  a frame defining an opening giving access to the processing chamber;
  a stirrer mounted inside the processing chamber;
  a cooling system, including at least one heat exchanger associated with the processing chamber to exchange heat with the processing chamber in order to cool the processing chamber;
  a closing device connected to the frame and movable between a closed configuration, at least partly occluding the opening, and an open configuration, allowing access to the processing chamber through the opening, the closing device comprising at least one door hinged to the frame;
  a retaining device acting on the closing device to keep the closing device in the closed configuration;
  wherein the retaining device comprises a rotary screw, connected to one of the at least one door and the frame and a respective stop surface connected to the other of the at least one door and the frame, the rotary screw being rotatably movable about a respective axis of rotation between a retaining configuration, where the rotary screw engages the stop surface to stop an opening movement of the at least one door, and a disengaged configuration, where the rotary screw disengages the stop surface to allow the opening movement of the at least one door;
  wherein the retaining device requires the rotary screw to be rotated in order to pass from the retaining configuration to the disengaged configuration, and vice versa;
  wherein the rotary screw has a crest extending in helical cylindrical fashion about the axis of rotation and configured to engage the stop surface to constrain the movement of the at least one door towards the open configuration.

14. A machine for making liquid or semi-liquid food products, comprising:
  a processing chamber for making an ice cream product;
  a frame defining an opening giving access to the processing chamber;
  a stirrer mounted inside the processing chamber;
  a cooling system, including at least one heat exchanger associated with the processing chamber to exchange heat with the processing chamber in order to cool the processing chamber;
  a closing device connected to the frame and movable between a closed configuration, at least partly occluding the opening, and an open configuration, allowing access to the processing chamber through the opening, the closing device comprising at least one door hinged to the frame;
  a retaining device acting on the closing device to keep the closing device in the closed configuration;
  wherein the retaining device comprises a rotary screw, connected to one of the at least one door and the frame and a respective stop surface connected to the other of the at least one door and the frame, the rotary screw being rotatably movable about a respective axis of rotation between a retaining configuration, where the rotary screw engages the stop surface to stop an opening movement of the at least one door, and a disengaged configuration, where the rotary screw disengages the stop surface to allow the opening movement of the at least one door;
  wherein the retaining device requires the rotary screw to be rotated in order to pass from the retaining configuration to the disengaged configuration, and vice versa;
  wherein the closing device comprises an inner door for covering the opening and including a further opening configured to allow partial access to the processing chamber when the inner door is in the closed position; and an outer door movable between a closed configuration, where the outer door is disposed in abutment against the inner door and positioned in front of the further opening, and an open configuration, where the outer door exposes the further opening at least partly to the outside; the rotary screw and the stop surface operating on the outer door to keep both the outer door and the inner door in the closed configuration.

15. A machine for making liquid or semi-liquid food products, comprising:
  a processing chamber for making an ice cream product;

a frame defining an opening giving access to the processing chamber;

a stirrer mounted inside the processing chamber;

a cooling system, including at least one heat exchanger associated with the processing chamber to exchange heat with the processing chamber in order to cool the processing chamber;

a closing device connected to the frame and movable between a closed configuration, at least partly occluding the opening, and an open configuration, allowing access to the processing chamber through the opening, the closing device comprising at least one door hinged to the frame;

a retaining device acting on the closing device to keep the closing device in the closed configuration;

wherein the retaining device comprises a rotary screw, connected to one of the at least one door and the frame and a respective stop surface connected to the other of the at least one door and the frame, the rotary screw being rotatably movable about a respective axis of rotation between a retaining configuration, where the rotary screw engages the stop surface to stop an opening movement of the at least one door, and a disengaged configuration, where the rotary screw disengages the stop surface to allow the opening movement of the at least one door;

wherein the retaining device requires the rotary screw to be rotated in order to pass from the retaining configuration to the disengaged configuration, and vice versa;

wherein the closing device comprises an inner door for covering the opening and including a further opening configured to allow partial access to the processing chamber when the inner door is in the closed position; and an outer door movable between a closed configuration, where the outer door is disposed in abutment against the inner door and positioned in front of the further opening, and an open configuration, where the outer door exposes the further opening at least partly; the rotary screw and the stop surface operating only on the inner door to keep the inner door in the closed configuration.

* * * * *